No. 765,296. PATENTED JULY 19, 1904.
A. L. PERKINS.
CHECK ROW PLANTER.
APPLICATION FILED JULY 22, 1903.
NO MODEL. 2 SHEETS—SHEET 1.
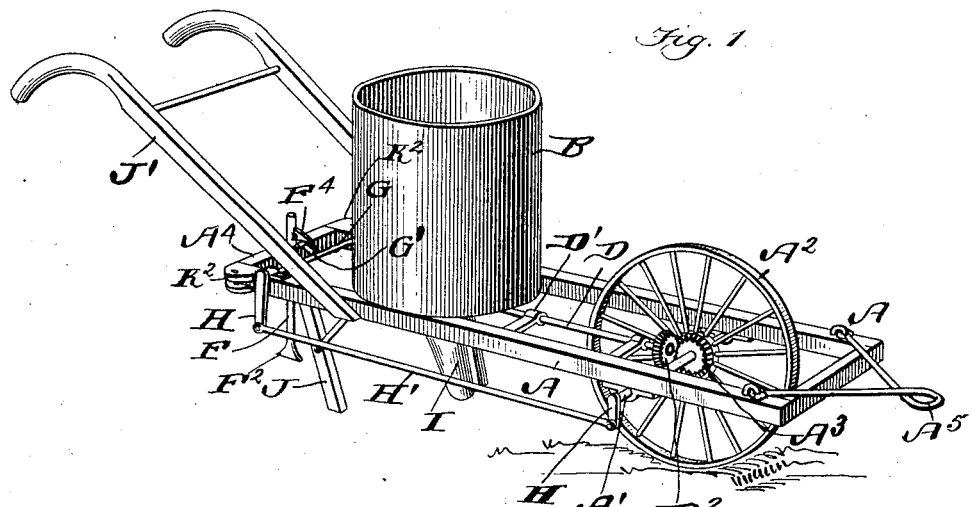
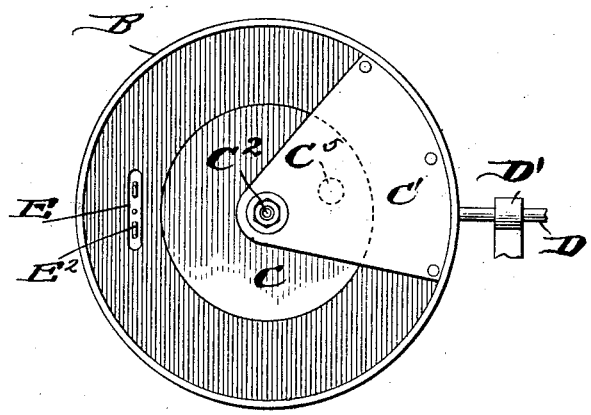
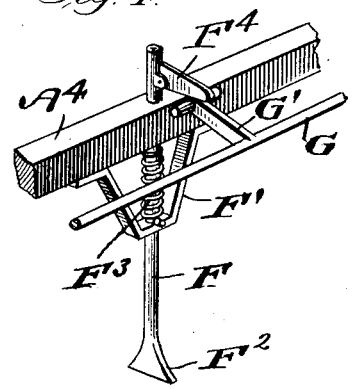
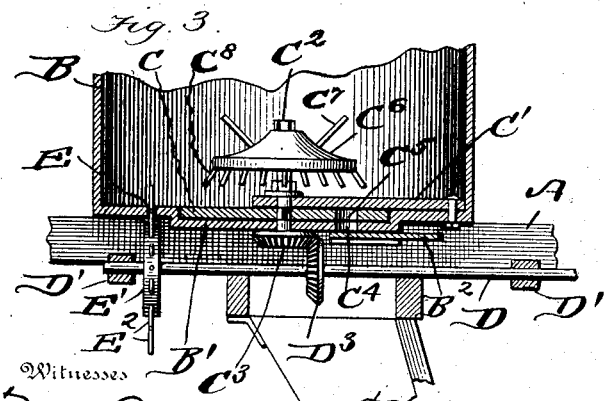
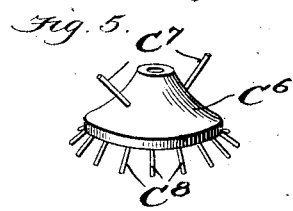
Inventor
A. L. Perkins.
By O'Meara & Brock
Attorneys
Witnesses No. 765,296. PATENTED JULY 19, 1904.
A. L. PERKINS.
CHECK ROW PLANTER.
APPLICATION FILED JULY 22, 1903.
NO MODEL. 2 SHEETS—SHEET 2.
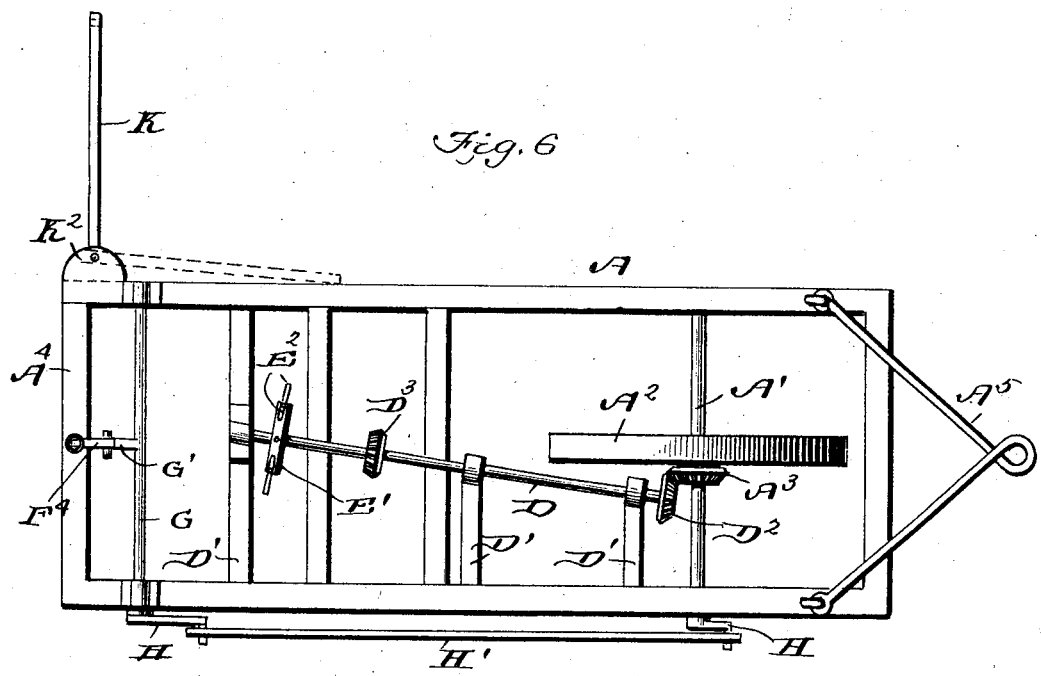
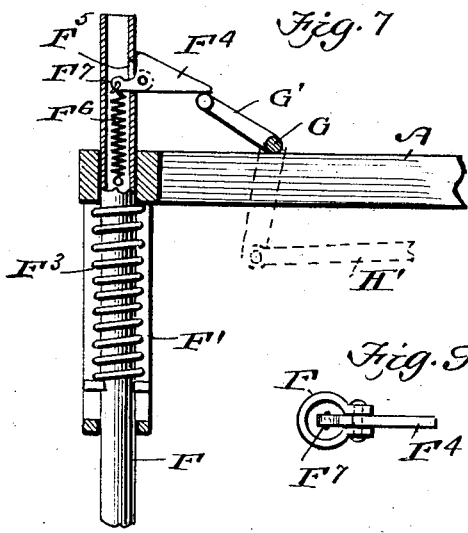
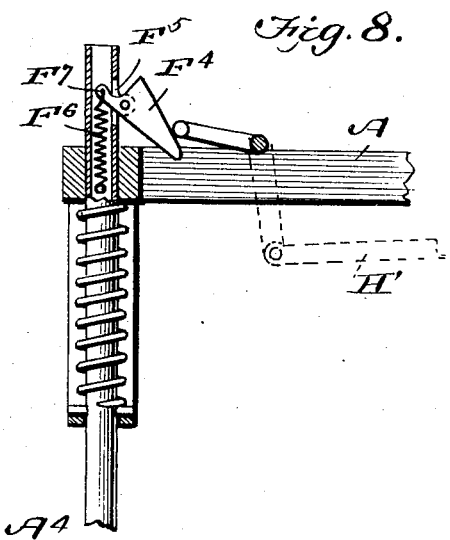
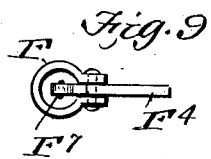
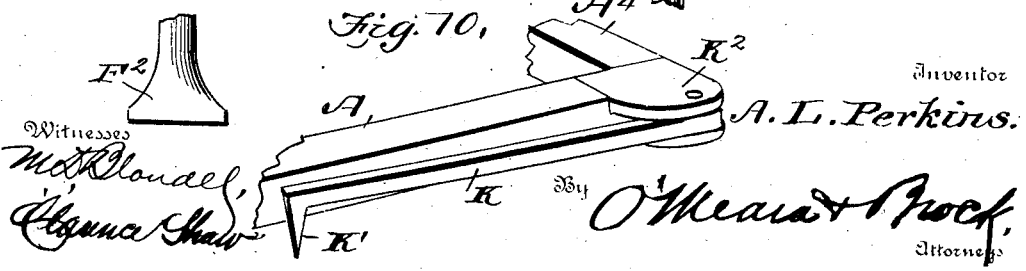
Witnesses
Inventor
A. L. Perkins.
By O'Meara & Brock,
Attorneys No. 765,296.

Patented July 19, 1904.

UNITED STATES PATENT OFFICE.

ALBERT L. PERKINS, OF PLEASANTGROVE, TEXAS.

CHECK-ROW PLANTER.

SPECIFICATION forming part of Letters Patent No. 765,296, dated July 19, 1904.

Application filed July 22, 1903. Serial No. 166,642. (No model.)

*To all whom it may concern:*

Be it known that I, ALBERT L. PERKINS, a citizen of the United States, residing at Pleasantgrove, in the county of Wood and State of Texas, have invented a new and useful Check-Row Planter, of which the following is a specification.

My invention is a check-row planter, and is designed as an all-around planter adapted for use in planting corn, peas, cotton, and all seeds usually planted in rows and not sown broadcast or drilled in a continuous stream.

My invention has for its object the planting of seeds at regular intervals along a row and the planting of parallel rows, so that the hills of such rows will be in alinement with those of the first row, thus facilitating subsequent cultivation of the field.

My invention consists in the novel features of construction and combination of parts hereinafter described, particularly pointed out in the claims, and shown in the accompanying drawings, in which—

Figure 1 is a perspective view of my planter. Fig. 2 is a plan view of the hopper. Fig. 3 is a vertical section through the lower portion of the hopper, the upper part being broken away and the seed-distributing mechanism being shown in elevation. Fig. 4 is a perspective view of the checker. Fig. 5 is a perspective view detached of the agitator used in the hopper. Fig. 6 is a plan view of the frame, the hopper being removed. Fig. 7 is a detail view of the checker-rod, parts of the frame being in section and the rod being shown in a raised position. Fig. 8 is a similar view, the rod being shown in a lowered position. Fig. 9 is a plan view showing the top of the rod. Fig. 10 is a detail perspective view of a gage.

In constructing my planter I employ a rectangular frame A. In the forward portion of this frame is journaled in the sides of the frame a rotatable shaft A', on which is rigidly keyed the wheel $A^2$. This wheel rotates within the frame, the periphery of the wheel traveling on the ground. Resting on the sides of the frame to the rear of the wheel is a cylindrical hopper B. The central portion of the bottom of the hopper is depressed, offset, or punched outward, as shown at B'. In the cylindrical socket formed above said offset portion and having its upper surface flush with the remainder of the hopper-bottom is rotatably arranged a disk C. Arranged on the bottom of the hopper is a sector-shaped plate C', its arc resting against the side of the hopper, and the plate is firmly secured to the bottom by suitable bolts or rivets at points adjacent the side of the hopper. Perforations are formed in the plate C', disk C, and bottom portion B' on the axial line of the hopper, and a stub-shaft $C^2$ extends upward through said perforations. At its lower outer end the shaft $C^2$ carries a beveled gear $C^3$, and above the plate C' a suitable collar or nut is secured to the shaft to hold it against downward movement, the gear $C^3$ preventing any upward movement with reference to the hopper. That portion of the shaft passing through the disk C, which has a square perforation, is squared, and it is obvious that the disk will rotate with the shaft. In that portion of the bottom B' lying under the plate C' an aperture $C^4$ is formed, and a similar aperture $C^5$ is formed in the disk C, both apertures being the same distance from the shaft. As the disk rotates the aperture $C^5$ will be brought in registry with the aperture $C^4$ once during each revolution of the disk.

On the shaft $C^2$ slightly above the bottom of the hopper is mounted the agitator, which comprises a conical disk having pins $C^7$ projecting upwardly and outwardly from its sides and pins $C^8$ projecting downwardly and outwardly from the bottom of the cone.

To rotate the gear $C^3$, a horizontal shaft D is supported longitudinally in the frame A by suitable brackets D', and on the forward end of the shaft is a beveled gear $D^2$, which meshes with the spur-gear $A^3$, carried by the wheel $A^2$. A beveled gear $D^3$, fixed on the shaft D intermediate its ends, meshes with the beveled gear $C^3$.

On the side of the hopper opposite the plate C' the hopper-bottom is slotted, as at E, said slot being transverse to the shaft D. A wheel E is arranged on said shaft immediately below the slot E, and the periphery of the wheel carries fine pins $E^2$, which project into the hopper through the narrow slot E.

The rear end member $A^4$ of the frame A is vertically perforated, and a vertically-movable checker-rod F slides in this perforation. The rod also works through a guide-bracket F', carried by the under side of the member $A^4$. A foot $F^2$ is formed on the lower end of the rod F, said foot acting as a marker. A spring $F^3$ is coiled around the rod and bears at its upper end on the under side of the end member $A^4$ and at the lower end on a pin carried by the rod. To lift the rod against the tension of the spring and gravity, a rock-shaft G is journaled in the sides of the frame adjacent the member $A^4$ and carries a knocker G', which knocker as the shaft G rocks strikes the under side of a projecting head $F^4$, carried at the upper end of the rod, thereby lifting same. The head $F^4$ is pivoted to lugs carried by the checker-rod. The rod is tubular and slotted at $F^5$, and the head $F^4$ has an arm $F^7$ projecting into the rod through the slot. A coiled spring $F^6$ is secured within the rod and has its upper end fastened to the arm $F^7$ of the head $F^4$. This spring draws the rear end of the arm downward, and the upper rear end of the head strikes the rod above the slot, thus limiting the downward movement of the arm and holding the head $F^4$ at a right angle to the checker-rod. The upper edge of the head is forwardly and downwardly beveled, as shown in the drawings. To rock the shaft G, both it and the shaft A' are provided with crank-arms H, connected by a pitman H', whereby rotation of one shaft rocks the other, the crank-arm to the shaft G being the longer.

The usual discharge-chute I is provided and also a rear supporting-leg J and handles J'. A gage K, having a downwardly-projecting point K', is pivoted between lugs $K^2$ at a rear corner of the frame. This gage may be turned inward against the sides of the frame when not in use. In use it is turned outward at right angles to the frame A and the apparatus moved into position so that the point K' will be over a hill of the row next the one to be planted.

The operation of my device is as follows: Seed having been placed in the hopper, the device is started, draft being attached to the draft-iron $A^5$. The rotation of the wheel $A^2$ will through the spur and bevel gears rotate stub-shaft $C^2$, disk C, and agitator $C^6$. Seed will pass into the perforation $C^5$ as into a pocket and be carried under the plate C', and as soon as the aperture $C^5$ registers with the aperture $C^4$ the seed will fall through the latter into the discharge-chute. The checker-rod is so timed that it will descend and mark each hill. When a new row is started, the wheel $A^2$ is turned so as to cause the checker to descend as the device is placed in alinement with the first hill of the preceding row and the device then started and all hills in the new row will come directly opposite the hills of the preceding rows. The agitator $C^6$ will prevent seed from packing in the central part of the hopper, and the pins $E^2$ will aid in tearing apart matted bunches of cotton-seed which, owing to the lint, have a tendency to adhere together and clog a planter of the ordinary type designed for planting grain only.

Having thus fully described my invention, what I claim as new, and desire to secure by Letters Patent, is—

1. The combination with a wheeled frame, of a vertically-movable checker-rod carried by said frame, a spring adapted to bear downwardly on the said checker-rod, a rock-shaft journaled in the frame adjacent the checker-rod, a knocker carried by and rotating with the rock-shaft, a projecting head pivotally connected to the checker-rod, a spring adapted to normally hold said head in a horizontal position and in the path of the rock-shaft, and means for rocking said shaft at certain intervals of time.

2. A device of the kind described comprising a vertically-movable checker-rod carrying a marker at its lower end and hollow in its upper portion, said hollow portion being slotted, a wedge-shaped head pivoted to the checker-rod and having an arm extending into the slot, a spring arranged within the hollow portion of the checker-rod and secured to the rod at its lower end and to the inner end of the arm at its upper end, a rock-shaft, means for rocking the shaft, a knocker carried by the shaft adapted to depress the outer end of the head when the shaft is rocked in one direction and to lift the head and checker-rod when the shaft is rocked in the opposite direction.

ALBERT L. PERKINS.

Witnesses:
THOS. W. BROCK,
J. HUB WRIGHT.